United States Patent [19]
Degonde

[11] Patent Number: 4,832,149
[45] Date of Patent: May 23, 1989

[54] DEVICE FOR CORRECTING THE ANGLE OF ATTITUDE OF AN AUTOMOTIVE VEHICLE

[75] Inventor: Michel G. Degonde, Rueil Malmaison, France

[73] Assignees: Automobiles Peugeot; Automobiles Citroen, both of France

[21] Appl. No.: 134,177

[22] Filed: Dec. 17, 1987

[30] Foreign Application Priority Data

Dec. 19, 1986 [FR] France ............... 86 17893

[51] Int. Cl.$^4$ ............................................. B62D 5/06
[52] U.S. Cl. .................................... 180/141; 180/140
[58] Field of Search ................ 180/140, 141, 142, 143

[56] References Cited
U.S. PATENT DOCUMENTS 4,597,462  7/1986  Sano et al. ................... 180/140

FOREIGN PATENT DOCUMENTS 2209346  6/1974  France .
2559117  8/1985  France .
2035931  6/1980  United Kingdom .

Primary Examiner—Kenneth R. Rice
Attorney, Agent, or Firm—Steinberg & Raskin

[57] ABSTRACT

A device for correcting the angle of attitude of an automotive vehicle, by inducing upon at least one axle a correction of lock in accordance with parameters representative of the dynamic state of the vehicle and measured by sensors delivering corresponding electric signals, these parameters including the instantaneous speed $S'$ of the vehicle, its angular velocity of yaw $\theta'$ and its lateral acceleration $R$ and for computing a correcting electric signal from these parameters which is applied to the lock correcting. The correcting signal is computed by working out this signal from a value $e$ equal to $(R-\theta'S')/S'$ or to $R-\theta'S'$.

8 Claims, 1 Drawing Sheet

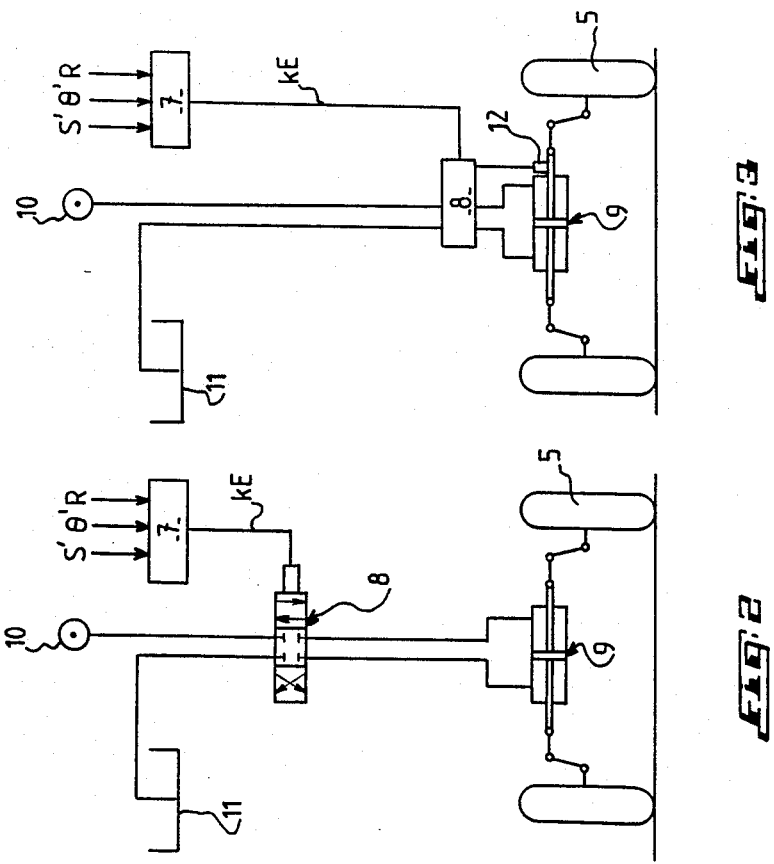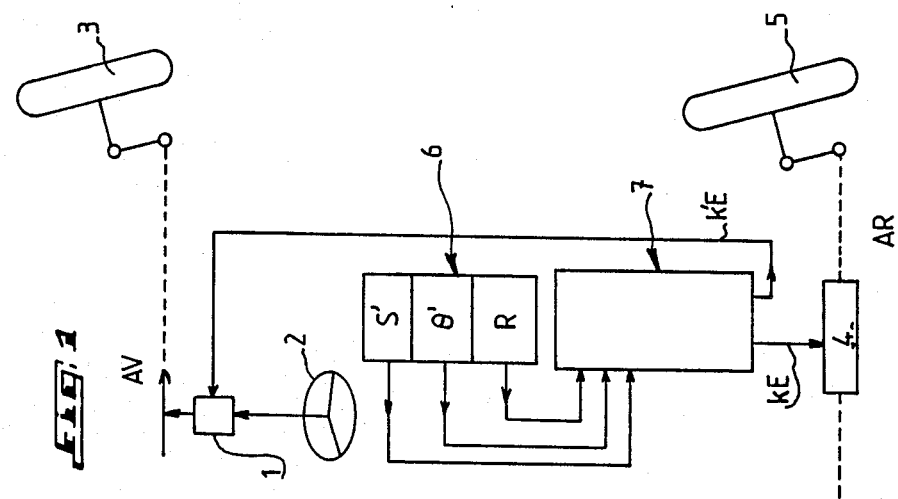

DEVICE FOR CORRECTING THE ANGLE OF ATTITUDE OF AN AUTOMOTIVE VEHICLE

BACKGROUND OF THE INVENTION

The invention relates to a device for correcting the angle of attitude of an automotive vehicle which comprises, in addition to the usual control of the steering of the wheels of an axle by the steering wheel, means inducing on at least one axle a correction of deflection or locking over in accordance with parameters representative of the dynamic state of the vehicle and measured by sensors delivering corresponding electric signals, these parameters including the instantaneous speed S' of the vehicle, its angular speed of yaw $\theta'$ and its lateral acceleration R and means for computing an electric correction signal from these parameters which is applied to deflection or lock correcting means.

The angle of attitude of the vehicle is the angle of the longitudinal direction of the vehicle with the velocity of its center of gravity.

The known systems of this kind make use of the values S', $\theta'$, R with a view to generate a signal which is the difference between two terms:

a reference term representative of the angular speed of yaw the vehicle would have in a stabilized state of ride under the influence of the instantaneous lock-over of the steering wheel;

a term supposed to be representative of the instantaneous dynamic state of the vehicle which is besides partially representative only of this state.

Such a system however which is directed to the attenuation of an excessive speed of yaw in relation to the instantaneous steering lock, is not suitable for carrying out an evolution of the vehicle at a zero or least attitude.

SUMMARY OF THE INVENTION

The object of the present invention is therefore to provide a correcting device of the type defined hereinabove which would remove the inconvenience just referred to.

To reach that goal, the correcting device according to the invention is characterized in that the means for computing the correcting electric signal are adapted for working out this signal from a value e equal to (R-$\theta'$S')/S' or to R-$\theta'$S'.

According to an advantageous characterizing feature of the invention, the correcting means are adapted to keep a deflection or lock velocity constant as long as the correcting signal is different from zero, this velocity becoming zero with the signal.

According to still another advantgeous characterizing feature of the invention, the correcting means are adapted to induce a correction of lock, the velocity of which is proportional to the correcting signal E.

According to still a further advantageous characterizing feature of the invention, the device according to the invention further comprises position control or check means adapted to allow to induce a correction of lock proportional to the correcting signal E.

According to still another advantageous characterizing feature of the invention, the lock correcting means are adapted to act upon the rear axle which usually is not steerable.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non-limiting examples only illustrating several presently preferred specific embodiments of the invention and wherein:

FIG. 1 diagrammatically shows a device according to the present invention in its most general form; and FIGS. 2 and 3 show two embodiments of a device according to the invention, respectively, in simpler versions thereof.

FIG. 1 shows a device for correcting the angle of attitude of an automotive vehicle in which the correction of the angle is applied both to the front axle AV and to the rear axle AR.

This device comprises a usual control 1 enabling the driver to steer the vehicle with the assistance of the steering wheel 2 by deflecting or changing the direction of the front wheels 3, means 4 for controlling the deflection of the rear wheels, a measuring unit 6 adapted to supply electric signals, namely a signal representative of the instantaneous speed S' of the vehicle, a signal representative of the angular velocity of yaw $\theta'$ measured by a gyrometer or any other equivalent means and a signal representing the transverse acceleration R of the vehicle as measured by an accelerometer arranged adjacent to the center of gravity as well as a computer 7 to which the three signals are applied.

The computing unit 7 is adapted to generate a control function E from the value e equal to R-$\theta'$S' or to (R-$\theta'$S')/S', the latter expression representing to a very good approximation the derivative with respect to the time of the angle of attitude of the vehicle.

The computing unit would apply lock control signals to the lock means 4 and possibly to an auxiliary means for correcting the steering lock of the front road wheels 3 incorporated into the usual control 1, namely the signals kE and k'E.

The control fraction E may be generated within the computing unit 7 from the value i in any manner as in a feedback control. The system would indeed operate in a closed loop and the value E may be considered as being representative of the error signal of a servo-system for operating the lock or deflecting means. The value E would necessarily be an uneven fraction of e and may be the function e itself.

FIG. 2 shows a first embodiment of the invention with a simpler construction providing for a lock or change in direction of the rear wheels 5. In this embodiment, the correcting signal kE from the computing unit 7 is applied to an electrovalve 8 which, according to the sign of E, would put one of the chambers of a double acting actuator 9 in communication with a source of pressure 10 and the other one with a tank 11 of a pressure fluid feeding system. Thus, the actuator 9 is operated to act upon the lock or deflection of the rear wheels 5.

As long as E is different from zero, the control bar would be displaced at a constant speed or, in other words, with a constant flow rate. When E becomes zero (or smaller than a relatively small value), the flow rate is cut off and the steering lock is then kept constsant.

Instead of the valve 8, an electrovalve supplying a flow rate proportional to the signal kE may also be used. In this case, with $\delta A$ being the steering lock of the rear axle AR, this lock would follow the law:

$d\delta A/dt = kE.$

In such a case, the velocity of lock or deflection of the axle is proportional to E.

FIG. 3 diagrammatically shows a second embodiment of the invention in which the steering lock is proportional to E. This would however require knowing the angular position δA at any time. For that purpose, the device comprises a sensor 12 of the angular position of the rear axle, which is connected to the electrovalve 8. The system 8, 9 and 12 may be a servo steering device in which the angle of lock or deflection is proportional to kE.

What is claimed is:

1. A device for correcting the angle of attitude of an automotive vehicle which comprises, in addition to the usual control of the steering of rod wheels of an axle by a steering wheel,
    means inducing on at least one axle a correction of lock in accordance with parameters representative of the dynamic state of the vehicle and measured by sensors delivering corresponding electric signals,
    these parameters including instantaneous speed S′ of the vehicle, its angular velocity of yaw $\theta'$ and its lateral acceleration R, and
    means for computing a correcting electric signal from these parameters which is applied to lock correcting means,
    wherein the improvement comprises
    said means for computing the correcting signal are adapted to develop this signal from a value (e) equal to $(R-\theta'S')/S'$ or to $R-\theta'S'$ in a manner of an error signal in a closed loop system, tending to reduce the correcting signal to zero by an appropriate control of the lock means.

2. A device according to claim 1, wherein the lock correcting means are adapted to keep a velocity of lock constant as long as the signal is different from zero, this velocity becoming zero together with said signal.

3. A device according to claim 1, wherein the lock correcting means are adapted to induce a correction of lock, the velocity of which is proportional to the correcting signal.

4. A device according to claim 1, further comprising means for controlling the angular axle position adapted to allow to induce a correction of lock proportional to the correcting signal.

5. A device according to claim 1, wherein the lock correcting means are adapted to act upon the rear axle.

6. A device according to claim 1, wherein said lock correction means comprise an actuator supplied with a pressure fluid from a pressure fluid source, through a pilot member adapted to couple said actuator to or to disconnect it from said pressure fluid source, said correcting signal being applied to said pilot member.

7. A device according to claim 6, wherein said actuator is a double acting actuator and said pilot member is formed by an electro-valve controlled by said correcting signal 8. A device according to claim 7, comprising means for controlling the angular axle position adapted to allow inducing a correction of lock proportional to the correcting means, said position control means being connected to said pilot member.

* * * * *